United States Patent
Barais (10) Patent No.: US 11,767,785 B2
(45) Date of Patent: Sep. 26, 2023

(54) VEHICLE PROVIDED WITH A POWER PLANT COMPRISING AT LEAST ONE HEAT ENGINE COOPERATING WITH AN AIR-CONDITIONING SYSTEM

(71) Applicant: AIRBUS HELICOPTERS, Marignane (FR)

(72) Inventor: Olivier Barais, Ensues la Redonne (FR)

(73) Assignee: AIRBUS HELICOPTERS, Marignane (FR)

(*) Notice: Subject to any disclaimer, the term of this patent is extended or adjusted under 35 U.S.C. 154(b) by 32 days.

(21) Appl. No.: 17/694,736

(22) Filed: Mar. 15, 2022

(65) Prior Publication Data
US 2022/0307407 A1   Sep. 29, 2022

(30) Foreign Application Priority Data

Mar. 24, 2021   (FR) ...................................... 2102935

(51) Int. Cl.
*F01P 3/20* (2006.01)
*B60H 1/00* (2006.01)
*F02C 3/30* (2006.01)

(52) U.S. Cl.
CPC ............ *F01P 3/20* (2013.01); *B60H 1/00271* (2013.01); *B60H 1/00492* (2013.01); *F02C 3/30* (2013.01); *B60H 2001/00307* (2013.01); *F01P 2060/08* (2013.01)

(58) Field of Classification Search
CPC ........... F01P 3/20; B60H 1/00492; F02C 3/30
See application file for complete search history.

(56) References Cited

U.S. PATENT DOCUMENTS

| 4,935,689 A | * | 6/1990 | Fujikawa | F02B 73/00 60/714 |
| 2009/0117840 A1 | | 5/2009 | Kresser et al. | |

(Continued)

FOREIGN PATENT DOCUMENTS

| EP | 2082959 A2 | 7/2009 |
| EP | 2082959 A3 | 12/2011 |

(Continued)

OTHER PUBLICATIONS

French Search Report for French Application No. FR2102935, Completed by the French Patent Office, dated Nov. 30, 2021, 9 pages.

*Primary Examiner* — Anthony Ayala Delgado
(74) *Attorney, Agent, or Firm* — BROOKS KUSHMAN P.C.

(57) ABSTRACT

A vehicle provided with a power plant having at least one heat engine, the vehicle having an air-conditioning system comprising a fluid circulating in a fluid circulation system, the fluid circulation system comprising at least one pump configured to cause the fluid to circulate in a fluid circuit. The vehicle comprises one injection member per heat engine configured to inject the fluid into the associated heat engine, the vehicle comprising a back-up circuit fluidly connecting the fluid circulation system to each injection member, the back-up circuit comprising a distribution device controlled by a controller to authorize, on command, circulation of the fluid towards an injection member.

18 Claims, 3 Drawing Sheets

(56) References Cited

U.S. PATENT DOCUMENTS

| | | | | |
|---|---|---|---|---|
| 2011/0314831 | A1* | 12/2011 | Abou-Jaoude | F23R 3/28 |
| | | | | 60/734 |
| 2014/0373505 | A1 | 12/2014 | Dyrla et al. | |
| 2017/0082024 | A1* | 3/2017 | Rodd | F02C 3/30 |
| 2022/0307407 | A1* | 9/2022 | Barais | F01P 3/20 |

FOREIGN PATENT DOCUMENTS

| | | |
|---|---|---|
| EP | 3418192 A1 | 12/2018 |
| FR | 3007391 A1 | 12/2014 |

* cited by examiner

Fig.3

VEHICLE PROVIDED WITH A POWER PLANT COMPRISING AT LEAST ONE HEAT ENGINE COOPERATING WITH AN AIR-CONDITIONING SYSTEM

CROSS REFERENCE TO RELATED APPLICATIONS

This application claims priority to French patent application No. FR 21 02935 filed on Mar. 24, 2021, the disclosure of which is incorporated in its entirety by reference herein.

TECHNICAL FIELD

The present disclosure relates to a vehicle provided with a power plant comprising at least one heat engine cooperating with an air-conditioning system of the vehicle.

BACKGROUND

More particularly, the disclosure relates to a system capable of increasing the power produced by a heat engine of a vehicle, for example an aircraft and, in particular, a rotorcraft.

A rotorcraft includes a power plant for rotating, in particular, a rotary wing. The power plant is provided with one or more heat engines that move a power transmission system connected to the rotary wing.

Furthermore, it should be noted that the term "heat engine" refers throughout the text to an engine burning a fuel, for example turboshaft engines or piston engines.

Each heat engine is capable of operating according to a plurality of operating ratings.

For example, the thermal limitations of a heat engine and the torque limitations of a gearbox of the power transmission system make it possible to define normal ratings known, for example, as the take-off rating, maximum continuous rating and maximum transient rating.

Multi-engine rotorcraft have emergency ratings used in the event of failure of one heat engine. These emergency ratings are sometimes known by the acronym "OEI", which stands for "One Engine Inoperative".

When one of the heat engines of a multi-engine power plant fails, the total power that can be supplied to the power transmission system is consequently reduced. The other heat engine, which is in operation, can then implement an emergency rating in order to produce greater power than the normal ratings for a short period of time, in order to limit the consequences of the failure.

The performances of a heat engine when an emergency rating is applied may limit the performances of the aircraft. In particular, the weight of the aircraft at take-off may be limited depending on the performances of the heat engines when an emergency rating is applied.

In order to improve the power produced by a heat engine, a fluid may be injected into the heat engine. The fluid may, in particular, be pure water, or a mixture of water and alcohol.

When the heat engine is a turboshaft engine equipped with a gas generator comprising an air intake and a compressor upstream of a combustion chamber, the water may, for example, be injected into the air intake.

Document FR 3 007 391 describes a power plant equipped with a back-up system for injecting fluid into two turboshaft engines. This system includes its own tank containing an aqueous fluid. The tank is connected by two pressurization pipes to the two gas generators of the two turboshaft engines. The fluid is then pressurized in the tank by gas taken from each gas generator. The system further includes one injection member per turboshaft engine, the injection member being connected to the tank by an injection pipe and being configured to spray the fluid into the associated engine. Two hydraulic selector valves are arranged respectively along the two injection pipes of the two turboshaft engines. Each hydraulic selector valve of one turboshaft engine communicates with the pressurization pipe leading to the other turboshaft engine.

Such a system is advantageous but can also be relatively heavy because of the presence of the dedicated tank. Furthermore, the gases taken from the turboshaft engines to operate the system are very hot, at approximately 400° C. The high temperature of the gases can then impose major installation constraints. It can therefore be difficult to install such a system.

Document EP 3 418 192 A1 describes a system provided with a lubrication device. This lubrication device includes a lubricating liquid that lubricates a mechanical device. The system further includes a thermal energy recovery circuit. This thermal energy recovery circuit has a first heat exchanger for heat exchange between a coolant and the lubricating liquid in order to heat a passenger compartment.

Document EP 2 082 959 A2 describes an aircraft comprising a first tank designed to contain a spent liquid suitable for supplying a jet engine after treatment.

Document US 2009/117840 describes a system and a method for delivering air into an aircraft cabin.

SUMMARY

An object of the present disclosure is therefore a vehicle provided with a power plant and a back-up system for injecting fluid, which is designed to be relatively discreet in terms of space requirement and weight and/or relatively easy to install on the vehicle.

The disclosure therefore relates to a vehicle provided with a power plant, said power plant having at least one heat engine, said vehicle having an air-conditioning system for controlling the air temperature in a section of the vehicle, said air-conditioning system comprising a fluid circulating in a fluid circulation system, the fluid circulation system comprising a fluid circuit running through the vehicle, said fluid circulation system comprising at least one pump configured to cause said fluid to circulate in said fluid circuit.

According to the disclosure, the vehicle comprises an injection member per heat engine of said at least one heat engine, said injection member being configured to inject said fluid into the associated heat engine, said vehicle comprising a back-up circuit fluidly connecting the fluid circulation system to each injection member, said back-up circuit comprising a distribution device controlled by a controller to authorize, on command, circulation of the fluid towards said injection member.

The term "air-conditioning system" refers to a system capable of heating or cooling or heating and cooling air in a section of the vehicle.

The expression "the vehicle comprises an injection member per heat engine of said at least one heat engine" means that, for each heat engine, the vehicle comprises an injection member specific to this heat engine. A single-engine vehicle thus comprises a single injection member for the single heat engine. A twin-engine vehicle thus comprises two injection members respectively for the two engines.

Similarly, the expression "per injection member" is used in the description irrespective of the number of injection members, i.e., both in the presence of a single heat engine and a single injection member and in the presence of several heat engines and several respective injection members. The same applies to the expression "each injection member".

The expression "said back-up circuit comprising a distribution device controlled by a controller to authorize, on command, circulation of the fluid towards said injection member" means that the controller transmits a control signal to the distribution device to modify the position of at least one element of this distribution device, for example by requesting a movement of all or part of the distribution device, so as to convey the fluid towards an injection member, if necessary.

The term "signal" may refer to a signal, for example an electrical, optical, analog or digital signal carrying information or an order, etc.

When this is not the case, the distribution device prevents the fluid from reaching the injection member or members. The fluid is then used solely for heating or cooling purposes, for example in a cabin of the vehicle.

One or more pumps then causes the fluid to circulate in a closed loop in the fluid circulation system. For example, the fluid circuit comprises pipes, a heater and/or a cooler, a hydraulic control selector valve, etc. A pump sucks the fluid from a tank and sets it in motion in this fluid circuit such that the fluid returns to the tank, having previously passed through the pipes, the heater and the cooler, if present, etc.

Surprisingly, if necessary, the controller controls the distribution device so that at least a portion of this same fluid of the air-conditioning system is used in order to obtain additional power in an assistance phase. By way of example, on a single-engine aircraft, the controller may be used to obtain additional power during a particular manoeuvre, in order to quickly leave an area of low visibility, etc. On a multi-engine helicopter, the controller can, for example, control the distribution device, in particular in the event of a failure of one heat engine, in order to inject the fluid into a heat engine that remains in operation.

Surprisingly, fluid from an air-conditioning system can also be used to obtain additional power with a heat engine. For example, the fluid comprises at least water, or indeed water and glycol, the percentage of water and glycol in the fluid being adapted by tests to best suit the two applications, namely in an air-conditioning system and in a system for increasing the power produced by a heat engine.

The disclosure is therefore relatively simple and can have a reasonable weight insofar as it can use the existing air-conditioning system of a vehicle. It is not necessary to add pumps, for example. Moreover, an air-conditioning system sometimes comprises two pumps, for example in order to provide a reliable de-misting function, which makes it possible to obtain a system for assisting a heat engine that also has a good level of reliability.

Furthermore, such a system may tend to reduce the risk of dormant failures. Indeed, the pump of pumps of the air-conditioning system are always in operation, except in the event of failure.

Moreover, such a system is not subject to the problems associated with the use of hot gas taken from a heat engine.

The vehicle may also have one or more of the following features.

The controller may comprise at least one computer.

According to one possibility, the vehicle may comprise at least one engine computer configured to control said at least one heat engine, the controller comprising said at least one engine computer.

Thus, at least one engine computer can act as a controller.

A multi-engine vehicle may include one engine computer per heat engine capable of detecting a failure of this heat engine. In the event of such a failure, this engine computer or another engine computer can act on a distribution device. Optionally, on a multi-engine vehicle, one of the engine computers is a master computer forming the controller.

Alternatively, or additionally, the controller may include another computer of the vehicle.

According to one possibility compatible with the preceding possibilities, the controller may comprise a human-machine interface.

For example, the injection of the fluid into a heat engine may be controlled by a pilot operating such a human-machine interface.

According to one possibility compatible with the preceding possibilities, said back-up circuit may be fluidly connected to the fluid circuit.

The fluid circuit may comprise a connection with three branches opening, in particular, on an inlet of the back-up circuit or a hydraulic selector valve capable of being connected to each injection member.

According to one possibility compatible with the preceding possibilities and one variant of the distribution device, this distribution device may comprise a controlled valve per injection member, each controlled valve having a blocker that can be moved from an open position authorizing the circulation of the fluid towards the associated injection member to a closed position preventing the circulation of the fluid towards the associated injection member.

Each controlled valve may be a flowmeter valve but may also be a simple solenoid valve.

According to one possibility, the fluid circulation system may include an isolation pressure relief valve downstream of an inlet of said back-up circuit, said isolation pressure relief valve being dimensioned to close when said fluid supplies one of the injection members.

In such a scenario, when the fluid is sent into a heat engine via an injection member, the pressure of the fluid at the inlet of the isolation pressure relief valve decreases. The pressure relief valve automatically stops the fluid from circulating in the fluid circuit. The fluid is then used only to obtain additional power with the heat engine supplied with fluid.

Alternatively, the fluid may also circulate in the fluid circuit.

According to another aspect, it is also possible to use a hydraulic selector valve of the fluid circuit in order to transfer the fluid towards a heat engine.

According to one possibility, the distribution device may comprise a hydraulic assistance selector valve of the fluid circuit, the hydraulic assistance selector valve having at least one back-up channel per injection member, each back-up channel being in fluid communication with an injection member.

When a hydraulic assistance selector valve is present, the expression "back-up circuit comprising a distribution device controlled by a controller to authorize, on command, circulation of the fluid towards said injection member" means that the controller controls the hydraulic assistance selector valve so that the requested channel brings the fluid circuit into communication with an injection member.

The hydraulic assistance selector valve is therefore arranged between an upstream sector of the fluid circuit and a downstream sector running through the section of the vehicle in which the air needs to be heated or cooled.

The hydraulic assistance selector valve may be a dedicated member, arranged downstream of the pump or pumps, for example, or may perform other functions.

For example, said hydraulic assistance selector valve is a part of a hydraulic control selector valve having a heating channel capable of being fluidly connected to a heater configured to heat said fluid within said fluid circulation system and/or said hydraulic selector valve having a cooling channel capable of being fluidly connected to a cooler configured to cool said fluid within said fluid circulation system. For example, the upstream sector then comprises a heating pipe exiting a heating loop and a cooling pipe exiting a cooling loop for the fluid.

If relevant, the controller can also control the hydraulic control selector valve, in order to manage the temperature of the fluid sent into a heat engine, if necessary. For this purpose, the controller can communicate with at least one temperature sensor measuring the temperature of the fluid, within the fluid circuit or the back-up circuit.

According to one possibility compatible with the preceding possibilities, the fluid circulation system being able to have a heater configured to heat said fluid within said fluid circulation system, said fluid circulation system being able to have a cooler configured to cool said fluid within said fluid circulation system, said controller can be connected, by a wired or wireless temperature control link, to the heater as well as to the cooler and to a temperature sensor measuring a temperature of said fluid, said controller being configured to control a temperature of said fluid by controlling the heater and the cooler.

The controller may be configured to apply a law for controlling the heater and the cooler in order to bring the fluid sent into the heat engine to a temperature that lies within a stored range, if required.

According to one possibility compatible with the preceding possibilities, the controller can be connected to said at least one pump by a wired or wireless flow rate control link, said controller being configured to control said at least one pump at least in the event of fluid being supplied to an injection member.

The function of regulating the flow rate of the fluid transmitted to an injection member can be managed by modifying the speed of rotation of the pumps. The controller may be configured to control each pump in order to make it operate at a stored speed. The system therefore does not require the addition of a flowmeter valve.

For example, the pumps used are electric pumps, the flow rate of which can be regulated.

The pumps can therefore be controlled so that the fluid circulates at a first flow rate when the injection members are not supplied with fluid and at a second flow rate, different from the first flow rate, when an injection member is supplied with fluid.

According to one possibility compatible with the preceding possibilities, the vehicle may comprise a power sensor unit measuring a current power produced by the power plant, said controller being connected to the power sensor unit, said vehicle comprising at least two said heat engines, the controller being configured to control said distribution device in order to supply one of said heat engines with fluid if the current power prior to a failure of the other heat engine is greater than a stored power.

If the power required at the time a heat engine fails is greater than the maximum power a heat engine can provide under normal conditions, namely when the fluid is not being injected, the controller controls a distribution device in order to obtain additional power by means of the fluid.

According to one possibility compatible with the preceding possibilities, said injection member may be configured to spray said fluid into an air intake of a said heat engine.

An injection member may be located in the air intake or may be directed towards the air intake. The term "air intake" refers to a system directing air towards an "engine block" and, for example, towards a compressor of a turboshaft engine. The air intake may comprise an air vent, a duct, filters, etc.

According to one possibility compatible with the preceding possibilities, the back-up circuit may comprise a filtration system upstream of said injection member, and therefore upstream of the injection member or members, as the case may be.

Such a filtration system may comprise a filter and perhaps even a bypass pipe. Indeed, particles may circulate within the fluid in an air-conditioning system. The filter then prevents the injection member or members from becoming blocked by these particles.

According to one possibility compatible with the preceding possibilities, the back-up circuit may comprise a bleed valve per injection member, regardless of the number of injection members. The bleed valves are intended to prevent the presence of air in the injection lines.

Indeed, the back-up circuit can always comprise fluid, even outside the assistance phase, in order to be able to assist an engine very quickly during such an assistance phase.

According to one possibility compatible with the preceding possibilities, the back-up circuit may comprise at least one back-up pressure sensor for measuring the back-up pressure of said fluid in the back-up circuit, said controller communicating with the back-up pressure sensor, said controller being configured to at least emit an alarm or not implement an assistance phase if the back-up pressure is less than an operating pressure threshold.

For example, at least one pipe of the back-up circuit may always contain a portion of said fluid. The back-up pressure sensor can detect a pressure drop caused by a leak in the back-up circuit. The controller can then, in particular, trigger an alarm, by transmitting a signal to an alerter, in order to warn the crew that the system for injecting fluid into the heat engine or engines has failed.

According to one possibility compatible with the preceding possibilities, the fluid circulation system may comprise a tank for containing a portion of the fluid.

For example, the fluid circulation system may comprise a tank with two compartments each fluidly connected to said at least one pump by a hydraulic distributor that is controlled by said controller, said two compartments comprising a main compartment and a back-up compartment supplied with fluid by the main compartment, for example by gravity, said fluid circulation system comprising a main pressure sensor measuring the main pressure of said fluid, said controller communicating with the main pressure sensor, the controller being configured to control the hydraulic distributor to draw said fluid only from the main compartment when the main pressure is greater than a leakage pressure threshold and from the back-up compartment when the main pressure is less than or equal to the leakage pressure threshold.

For example, the main pressure sensor is arranged within the fluid circuit downstream of the section of the vehicle that is to be heated or cooled.

This feature allows a portion of the fluid to be contained in the back-up compartment, such that there may be a reserve of fluid in the event of a hydraulic leak in the air-conditioning system.

According to one possibility compatible with the preceding possibilities, said fluid circulation system may comprise a discharge circuit opening into said tank, the discharge circuit being provided with a discharge pressure relief valve configured to open when the hydraulic distributor draws the fluid from the back-up compartment and no injection member is supplied with fluid.

Optionally, and in particular when a tank with two compartments is present, this system can make it possible to operate the pumps in good conditions. In the event of leaks, and outside the assistance phase, the pumps can operate correctly by drawing the fluid from the back-up compartment via the hydraulic distributor, the fluid returning to the tank via the discharge circuit as long as an assistance phase is not initiated, in order to minimize the risk of losing all the fluid, depending on the location of the leak.

Therefore, and depending on the location of the leak, the pumps do not operate empty, and a portion of the fluid remains in the system despite the leak.

For example, the fluid circulation system may comprise an intermediate pipe connecting said at least one pump to the hydraulic distributor, said hydraulic distributor bringing said at least one pump and the fluid circuit into fluid communication only when the main pressure is greater than the leakage pressure threshold.

In addition to a vehicle, the disclosure relates to a method applied by this vehicle.

The disclosure thus provides an assistance method for assisting a power plant of a vehicle, said power plant having at least one heat engine, said vehicle having an air-conditioning system for controlling the air temperature in a section of the vehicle, said air-conditioning system comprising a fluid circulating in a fluid circulation system, the fluid circulation system comprising a fluid circuit running through the vehicle, said fluid circulation system comprising at least one pump configured cause said fluid to circulate in said fluid circuit.

This method comprises an assistance phase of assisting a heat engine to be assisted from said at least one heat engine, the assistance phase comprising the following step: activation, on command from a controller, of a distribution device present in a back-up circuit fluidly connecting the fluid circulation system and an injection member of said heat engine to be assisted, in order to convey said fluid to the injection member supplying fluid to said heat engine to be assisted.

Optionally, the vehicle possibly comprising at least two heat engines, the method may include a step of detecting a failure of one heat engine from said at least two heat engines, said assistance phase being implemented for the heat engine that remains in operation following said detection of a failure of one heat engine.

Optionally, the method may include a step of measuring a power produced by the power plant.

BRIEF DESCRIPTION OF THE DRAWINGS

The disclosure and its advantages appear in greater detail in the context of the following description of embodiments given by way of illustration and with reference to the accompanying figures, in which.

DETAILED DESCRIPTION

Elements that are present in more than one of the figures are given the same references in each of them.

Figure 1:
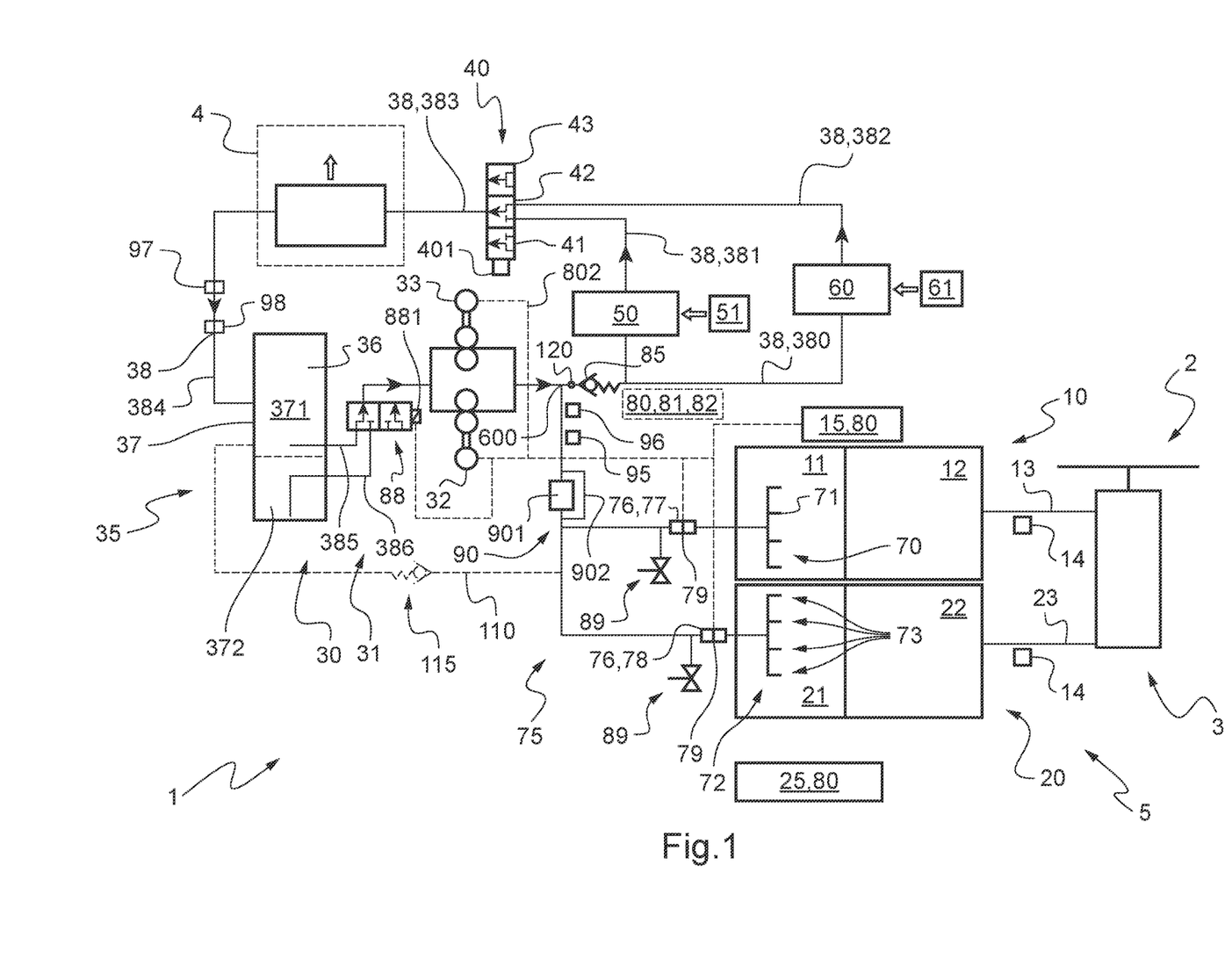
FIG. 1 is a diagram showing an example of a vehicle according to the disclosure having a distribution device comprising controlled valves.
Figure 2:
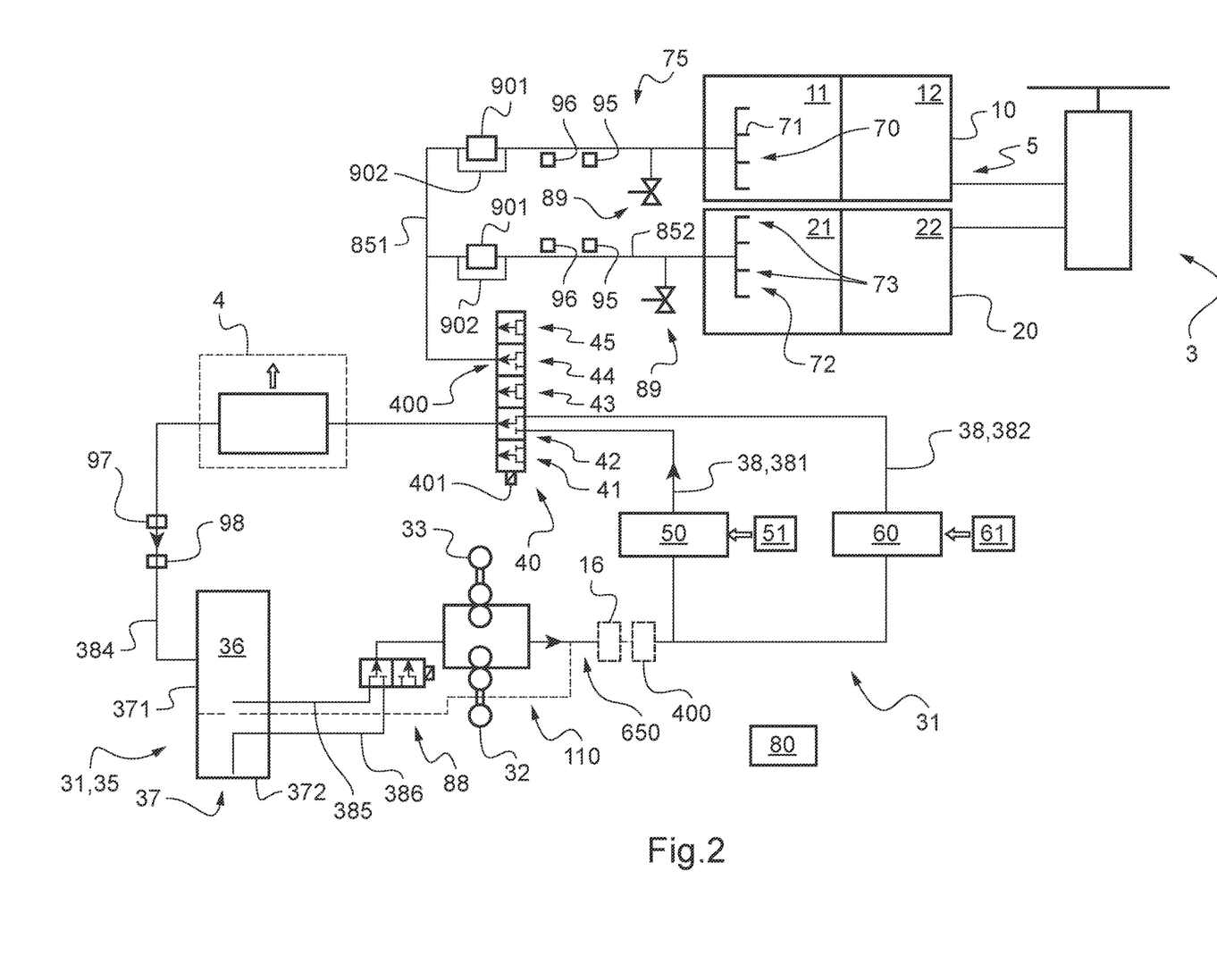
FIG. 2 is a diagram showing a vehicle according to the disclosure having a distribution device comprising channels of a hydraulic selector valve.
Figure 3:
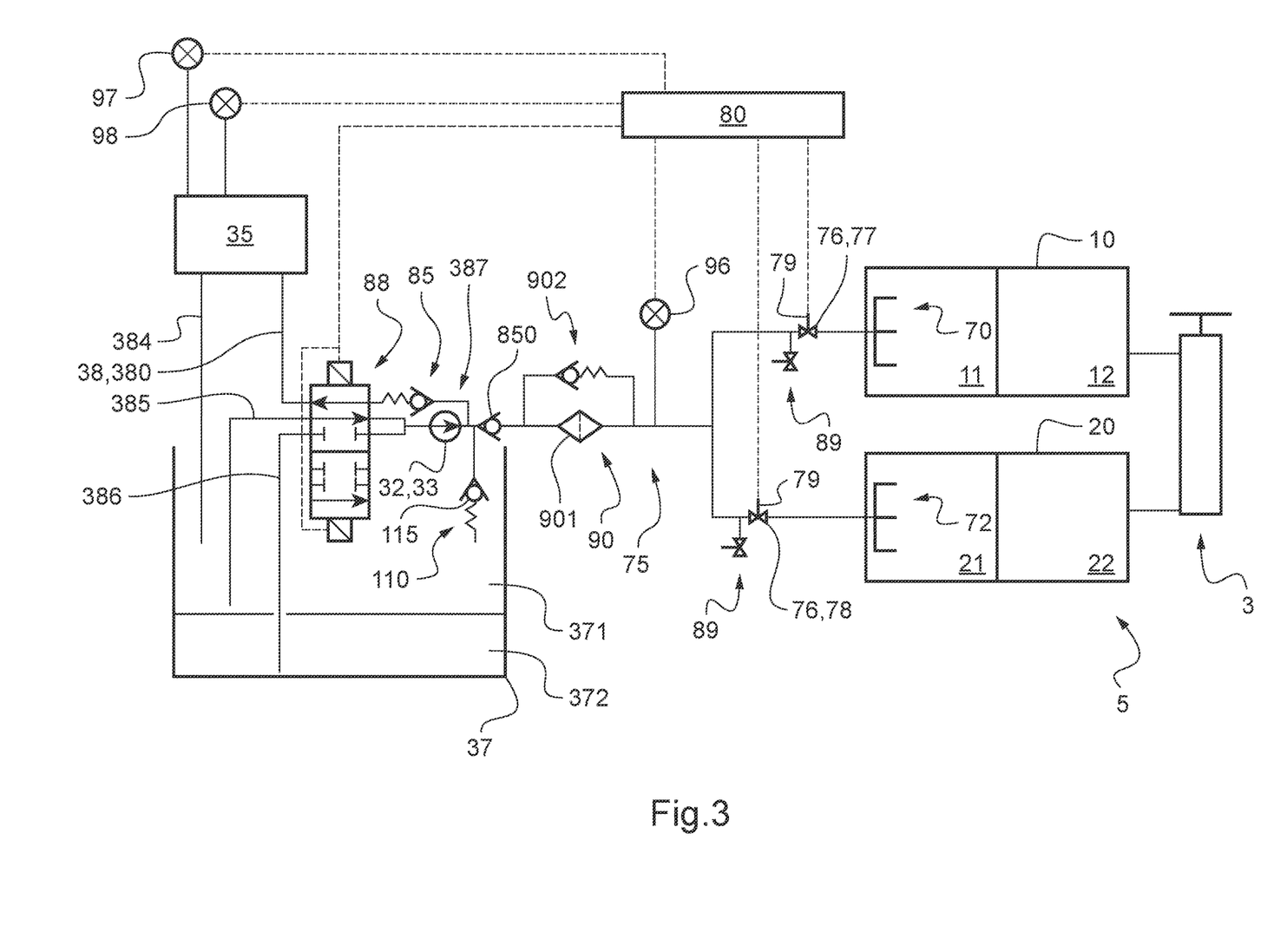
FIG. 3 is a diagram showing an example of a vehicle according to the disclosure having a distribution device with controlled valves.

FIG. 1, FIG. 2 and FIG. 3 show vehicles 1 according to the disclosure and, by way of example, aircraft. In particular, the vehicle 1 may be a rotorcraft provided with a rotary wing. Alternatively, the vehicle may be a land or sea vehicle, for example.

Regardless of the embodiment, and in reference to FIG. 1, for example, the vehicle 1 comprises a power plant 5. For example, the vehicle 1 comprises blades of a rotor or of a propeller rotated by the power plant 5. According to the example shown, the vehicle 1 may include a rotary wing 2 set in motion by a power transmission system 3, this power transmission system 3 itself being set in motion by the power plant 5.

Regardless of the nature of the members set in motion by the power plant 5, this power plant 5 comprises at least one or indeed at least two heat engines 10, 20 for setting these members in motion. The term "heat engine" refers to an engine operating with a fuel, for example a turboshaft engine or a piston engine.

The expression "each heat engine" is used regardless of the number of heat engines, i.e., in the presence of one or more heat engines.

Each heat engine 10, 20 may comprise an air intake 11, 21 injecting air into an engine block 12, 22. On a turboshaft engine, the air intake 11, 21 may open into a gas generator. Each heat engine 10, 20 further comprises a working shaft 13, 23 setting the required members in motion. The working shafts 13, 23 set the power transmission system 3 in motion, according to the example shown.

Each heat engine 10, 20 can be controlled by a conventional engine computer 15, 25. A single engine computer 15, 25 can control the operation of several heat engines 10, 20 or only the operation of one heat engine 10, 20, according to the example shown. Typically, each engine computer 15, 25 can determine whether a heat engine 10, 20 has failed. One of the engine computers 15, 25 may be a master computer.

Furthermore, the vehicle 1 can include a power sensor unit 14 measuring the power produced by the power plant 5. For example, the power sensor unit 14 includes a torque meter and a rotational speed sensor arranged on each working shaft 13, 23 of each heat engine, and a computer processing the measurements. The power produced by the power plant 5 is then equal, where applicable, to the sum of the powers produced by the working shafts 13, 23. For example, a computer or indeed one of the engine computers 15, 25 calculates the power produced by the power plant 5 by using the signals transmitted by each sensor of the power sensor unit 14.

Irrespective of these features, the vehicle 1 comprises an air-conditioning system 30 for controlling the temperature of the air present in a section 4 of the vehicle 1. For example, this section 4 comprises a cabin and/or a cockpit.

The air-conditioning system 30 comprises a fluid 36 circulating in a fluid circulation system 31. The fluid 36 may comprise a mixture of water and glycol.

Therefore, the fluid circulation system 31 comprises a fluid circuit 35 running through the vehicle 1 and at least one pump 32, 33 configured cause said fluid 36 to circulate in the fluid circuit 35. In particular, for safety reasons, the fluid circulation system 31 may have at least two pumps 32, 33, for example arranged in parallel.

The fluid circuit 35 is also provided with multiple elements for causing the fluid 36 to circulate in the appropriate section 4. The fluid circulation system 31 may in particular comprise multiple pipes 38, and in particular at least one air-conditioning pipe 383 running through the section 4. The term "pipe" designates one or more tubes in which the fluid 36 circulates.

Moreover, the fluid circulation system 31 may include a tank 37 suitable for storing a portion of the fluid 36. The pump or pumps 32, 33 draw the fluid 36 from the tank 37 and propel it into the fluid circuit 35. The fluid 36 reaches the section 4 and then returns to the tank 37.

Irrespective of whether or not a tank is present, the fluid circulation system 31 may comprise a heater 50 and/or a cooler 60 arranged upstream of the section 4, and if necessary downstream of the pump or pumps 32, 33.

It should be noted that the terms "upstream" and "downstream" refer to a direction of circulation of the fluid 36.

The heater 50 may be of a conventional shape for heating the fluid 36 using a hot source 51 of the vehicle 1, for example an engine compartment. For example, the heater 50 is arranged between a conveyor pipe 380 supplied with fluid by the pump or pumps 32, 33, and a heating pipe 381 directed towards the air-conditioning pipe 383.

The cooler 60 may be of a conventional shape for cooling the fluid 36 using a cold source 61 of the vehicle 1. The cooler 60 is arranged between the conveyor pipe 380 and a cooling pipe 382 directed towards the air-conditioning pipe 383.

Consequently, the fluid circuit 35 may comprise a hydraulic control selector valve 40 arranged between the air-conditioning pipe 383 and the heating 381 and cooling 382 pipes. The hydraulic control selector valve 40 may comprise various channels, namely various hydraulic paths possibly formed in a slide of this hydraulic control selector valve 40. The hydraulic control selector valve 40 can be controlled in a conventional manner in order to implement the appropriate channel or channels at any point in time. The figures show, for illustrative purposes, a slide valve comprising a movable part that can be moved, for example, by an actuator 401.

The hydraulic selector valve 40 may comprise at least one heating channel 41 capable of being fluidly connected to the heater 50, for example by bringing the heating pipe 381 and the air-conditioning pipe 383 into fluid communication. The hydraulic selector valve 40 may comprise at least one cooling channel 42 capable of being fluidly connected to the cooler 60, by bringing the cooling pipe 382 and the air-conditioning pipe 383 into fluid communication. Optionally, the hydraulic selector valve 40 may comprise a tempered channel 43 bringing the air-conditioning pipe 383 into fluid communication with the heating pipe 381 and the cooling pipe 382.

For example, the pumps 32, 33 are fluidly connected to the tank 37 and are fluidly connected to the heater 50 and to the cooler 60 by the conveyor pipe 380. The heater 50 and the cooler 60 are fluidly connected to the hydraulic control selector valve 40, by the heating pipe 381 and the cooling pipe 382 respectively. The hydraulic control selector valve 40 then opens into the air-conditioning pipe 383 that is followed by a return pipe 384 opening into the tank 37.

The fluid 36 can then pass through the pump or pumps 32, 33 and be injected into the heater 50 and the cooler 60 before reaching the hydraulic control selector valve 40. Then, under normal conditions, the hydraulic control selector valve 40 directs the heated and/or cooled fluid 36 into the air-conditioning pipe 383. The fluid 36 then returns to the tank 37 via the return pipe 384.

Irrespective of these aspects and, in particular, the features of the air-conditioning system 30, the vehicle 1 is provided with an assistance system making it possible to increase the power delivered by the heat engine or engines 10, 20, if applicable, by means of the fluid 36.

This assistance system comprises one injection member 70, 72 per heat engine 10, 20. Each injection member 70, 72 is configured so as to be able to inject the fluid 36 into the associated heat engine 10, 20. In particular, each injection member 70, 72 can direct the fluid 36 into an air intake 11, 21 of the corresponding heat engine 10, 20. To this end, each injection member 70, 72 may comprise one or more tubes, one or more nozzles 71, 73, etc.

The assistance system further includes a back-up circuit 75 fluidly connecting the fluid circulation system 31 to each injection member 70, 72. In addition to at least one pipe, the back-up circuit 75 has a distribution device 76 configured to authorize or prevent, on request, the circulation of the fluid 36 towards the injection members 70, 72. Optionally, the back-up circuit 75 may comprise one bleed valve 89 per injection member 70, 72, connected to a pipe opening into this injection member 70, 72.

The back-up circuit 75 may comprise a filtration system 90 upstream of the injection member or members 70, 72. Such a filtration system 90 may comprise at least one filter. For example, a filter includes a filter means 901 and, optionally, a bypass pipe 902.

If several injection members 70, 72 are present, such a filtration system 90 may comprise one filter 901, 902 on a pipe common to all the injection members 70, 72, or, if there is no common pipe, one filter 901, 902 per injection member 70, 72.

According to another feature, the distribution device 76 is controlled by a controller 80. The controller 80 is configured to transmit a control signal to the distribution device 76 to authorize, on command, the circulation of the fluid 36 towards an injection member 70, 72, if necessary. The controller 80 can, in particular, control the hydraulic control selector valve 40, at least during an assistance phase.

By way of example, the controller 80 may comprise at least one processor and at least one memory, at least one integrated circuit, at least one programmable system, or at least one logic circuit, these examples not limiting the scope to be given to the term "controller". The term "processor" may refer equally to a central processing unit (CPU), a graphics processing unit (GPU), a digital signal processor (DSP), a microcontroller, etc.

The controller 80 may comprise a computer 82, or indeed at least one engine computer 15, 25 and, possibly, the master computer or indeed all the engine computers 15, 25. For example, each engine computer 15, 25 is configured to perform the function of the controller 80 in the event of a failure either of the heat engine 10, 20 which it controls, or of the other heat engine 10, 20 on a multi-engine vehicle, for example. If the controller 80 includes a computer 82 separate from the engine computer or computers 15, 25, the engine computer or computers 15, 25 are configured to transmit a signal to the controller 80 when a heat engine 10, 20 is detected to have failed.

Such a controller 80, and in particular at least one power computer of the controller, may be connected to the power sensor unit 14. Consequently, the controller 80 of a multi-engine vehicle may be configured to transmit a control signal to the distribution device 76 during an assistance phase, in order to supply fluid 36 to one of the heat engines 10, 20, if the current power prior to a failure of the other heat engine 10, 20 is greater than a power stored in the controller or elsewhere. On a single-engine vehicle, the controller 80 can initiate an assistance phase if the current power is greater than a stored power.

The controller 80, and in particular at least one computer of the controller, can communicate with at least one temperature sensor 95, 97 measuring the temperature of the fluid 36 in the back-up circuit 75, or even in the fluid circuit 35, for example.

If applicable, the controller 80 may be connected to the heater 50 and to the cooler 60 by a wired or wireless temperature control link. The controller 80 is then configured to control the temperature of the fluid 36, in particular by controlling the heater 50 and the cooler 60, or indeed the hydraulic control selector valve 40, depending on the temperature or temperatures measured by the temperature sensor or sensors 95, 97.

The controller 80, and in particular at least one computer of the controller, may be connected to each pump 32, 33 by a wired or wireless flow rate control link 802. The controller 80 is then configured to control each pump 32, 33 during an assistance phase, in order to achieve an adequate flow rate of fluid 36. For example, the controller 80 transmits a signal to the pumps 32, 33, this signal carrying a speed of rotation that a rotating element of the pumps 32, 33 must reach.

According to another optional feature, the back-up circuit 75 may comprise at least one back-up pressure sensor 96 communicating with the controller 80 via a wired or wireless link. Each back-up pressure sensor 96 transmits a signal carrying a pressure referred to as the "back-up pressure" of the fluid 36 in the back-up circuit 75.

Optionally, the controller 80, and in particular at least one computer of the controller, can communicate with an alerter, not shown here, which is capable of generating an alarm that may be audible, visual, tactile, etc. If the back-up pressure is less than an operating pressure threshold, the controller 80 is configured to transmit a signal to the alerter in order to emit an alarm and/or not implement an assistance phase.

According to another optional feature, the tank 37, if present, may comprise a single container. According to the examples shown, the tank 37 may comprise two compartments 371, 372 each fluidly connected to the pump or pumps 32, 33 by a hydraulic distributor 88. Thus, the tank 37 may have a main compartment 371 supplied with fluid by the fluid circuit 35 and a back-up compartment 372 supplied with fluid 36 by the main compartment 371. The hydraulic distributor 88 is then fluidly connected by two conveyor pipes 385, 386 respectively to the main compartment 371 and to the back-up compartment 372.

Moreover, the fluid circulation system 31 comprises a main pressure sensor 98 measuring the main pressure of the fluid 36, for example within the return pipe 384 present upstream of the tank 37 and at the outlet of the section 4 of the vehicle.

The controller 80, and in particular at least one computer of the controller, communicates with the main pressure sensor 98. Consequently, the controller 80 can be configured to control an actuator 881 of the hydraulic distributor 88 in order to draw the fluid 36 only from the main compartment 371 when the main pressure is greater than a leakage pressure threshold and from the back-up compartment 372 when the main pressure is less than or equal to the leakage pressure threshold. According to the example shown, the hydraulic distributor 88 may be a selector valve having a slide that can be moved by the actuator 881.

According to another optional feature, and in particular in the presence of a tank 37 with two compartments, the fluid circulation system 31 may comprise, downstream of the pump or pumps 32, 33, a discharge circuit 110 opening into said tank 37. Such a discharge circuit 110 may have a discharge pressure relief valve 115 configured to open when the hydraulic distributor 88 draws the fluid from the back-up compartment 372 and when the injection member or members 70, 72 are not supplied with fluid.

According to another aspect, the controller 80 may comprise a human-machine interface 81 so that a pilot can control the injection of fluid 36 into a heat engine 10, 20, if necessary. For example, the human-machine interface 81 may comprise a touch screen, a button or the like. For example, the human-machine interface 81 may be activated by an individual in an emergency situation, during a training phase, during a pre-flight visit for the purpose of checking operation, during a maintenance operation, etc.

The controller 80 may therefore comprise at least one computer configured to perform one or more of the preceding actions and/or a human-machine interface.

Irrespective of these various possibilities and according to the embodiment of FIG. 1, the back-up circuit 75 is fluidly connected to a pipe of the fluid circuit 35 and to the conveyor pipe 380, according to the example shown. Optionally, an isolation pressure relief valve 85 may be arranged in the conveyor pipe 380 downstream of the connection to the back-up circuit 75. The isolation pressure relief valve 85 may be dimensioned to close when the fluid 36 is supplying an injection member 70, 72. In these conditions, the pressure obtained at the inlet of the isolation pressure relief valve 85 can be calculated in a conventional manner in order to determine the dimensions the isolation pressure relief valve 85.

According to this embodiment of FIG. 1, the distribution device 76 may comprise controlled valves 77, 78 arranged respectively in the back-up circuit 75 upstream of the injection members 70, 72. Each controlled valve 77, 78 has a blocker 79 that can be moved, as ordered by the controller 80, from an open position to a closed position. For example, each controlled valve 77, 78 is a solenoid valve, the controller 80 transmitting an electrical signal to the controlled valve 77, 78 in order to open or close it. Each controlled valve 77, 78 is then fluidly connected to the fluid circuit 35 by an upstream pipe and to an injection member 70, 72 by a downstream pipe.

Therefore, a portion of the fluid 36 is always in the emergency pipe, upstream of the controlled valves 77, 78.

In a normal operating mode, the fluid 36 circulates within the fluid circuit 35. If a main pressure sensor 98 and a tank 37 with two compartments are present, the controller 80 monitors the main pressure of the fluid 36 by means of the main pressure sensor 98. The hydraulic distributor 88 draws the fluid from the main compartment 371. If the fluid circuit 35 leaks, the pressure in this fluid circuit 35 drops. As soon as the main pressure measured by the main pressure sensor 98 drops below a leakage pressure threshold, the controller 80 controls the hydraulic distributor 88 to draw the fluid from the back-up compartment 372. Optionally, the controller 80 can control an auxiliary valve 120 to direct the fluid towards the back-up circuit 75, in order for it to return to the tank 37 via the discharge circuit 110. Such an auxiliary valve can be positioned downstream of a branch 600 opening into the discharge circuit 110 and as close as possible to this discharge circuit 110. The pump or pumps 32, 33 thus remain in operation and the fluid 36 no longer circulates towards the circuit that may have caused the leak. Irrespective of these aspects, during the assistance phase, the controller 80 controls a controlled valve 77, 78 of the distribution device 76 to supply fluid to an operating heat engine 10, 20.

According to the embodiment of FIG. 2, the distribution device 76 may comprise a hydraulic assistance selector valve 400 connected to the fluid circuit 35. The hydraulic assistance selector valve 400 may have at least one back-up channel 44, 45 per injection member 70, 72, each back-up channel 44, 45 being in fluid communication with an injection member 70, 72 via an injection line 851, 852. As indicated above, each injection line 851, 852 may comprise a filter 901, 902, a temperature sensor 95, a back-up pressure sensor 96, and a bleed valve 89.

Optionally, the hydraulic assistance selector valve 400 may be a part of the hydraulic control selector valve 40. Each back-up channel 44, 45 can bring the heating pipe 381 and/or the cooling pipe 382 into fluid connection with an injection member 70, 72.

According to the illustration shown in dashed lines, the hydraulic assistance selector valve 400 may be an independent valve, for example arranged at the outlet of the pump or pumps 32, 33.

Optionally, an auxiliary valve 16 is interposed before the hydraulic assistance selector valve 400, for example downstream of a branch 650 opening into a discharge circuit 110. In a normal operating mode, the fluid 36 circulates within the fluid circuit. If a main pressure sensor 98 and also a tank 37 with two compartments and, for example, an independent hydraulic assistance selector valve 400 are present, the controller 80 monitors the main pressure of the fluid 36 by means of the main pressure sensor 98. The hydraulic distributor 88 draws the fluid from the main compartment 371. If the fluid circuit 35 leaks, the pressure in this fluid circuit 35 drops. As soon as the pressure measured by the main pressure sensor 98 drops below a leakage pressure threshold, the controller 80 controls the hydraulic distributor 88 to draw the fluid from the back-up compartment 372. The controller 80 can also control the auxiliary valve 16 to close it. The fluid returns to the tank 37 via the discharge circuit 110. The pump or pumps 32, 33 thus remain in operation and the fluid 36 no longer circulates towards the circuit that may have caused the leak. Irrespective of this possibility, during the assistance phase, the controller 80 controls the hydraulic assistance selector valve 400, or indeed opens the auxiliary valve 16, to supply fluid to an operating heat engine 10, 20.

FIG. 3 shows an embodiment comprising, as in the embodiment of FIG. 1, a distribution device 76 comprising controlled valves 77, 78 arranged respectively in the back-up circuit 75 upstream of the injection member or members 70, 72.

The embodiment of FIG. 3 also necessarily comprises a tank 37 with two compartments 371, 372, and a hydraulic distributor 88. In addition, an intermediate pipe 387 is, for example, provided with an isolation pressure relief valve 85. Irrespective of this possibility, the intermediate pipe 387 connects the pumps 32, 33 to the hydraulic distributor 88. This distributor is provided with a channel capable of bringing the pump or pumps 32, 33 and the fluid circuit 35 into fluid communication only when the main pressure is greater than the leakage pressure threshold. The back-up circuit may also include a non-return valve 850.

In a normal operating mode, the fluid 36 circulates within the fluid circuit 35. If a main pressure sensor 98 and a tank 37 with two compartments 371, 372 are present, the controller 80 monitors the pressure of the fluid 36 by means of the main pressure sensor 98. The hydraulic distributor 88 draws the fluid 36 from the main compartment 371. If the fluid circuit 35 leaks, the main pressure in this fluid circuit 35 drops. As soon as the main pressure measured by the main pressure sensor 98 drops below the leakage pressure threshold, the controller 80 controls the hydraulic distributor 88 to draw the fluid from the back-up compartment 372. In this position, the hydraulic distributor 88 isolates the intermediate pipe 387 from the fluid circuit 35. The fluid 36 then returns to the tank 37 via the discharge circuit 110. The pump or pumps 32, 33 thus remain in operation and the fluid 36 no longer circulates towards the fluid circuit that may have caused the leak. Irrespective of these aspects, during the assistance phase, the controller 80 controls a controlled valve 77, 78 of the distribution device to supply fluid to an operating heat engine 10, 20. The pressure relief valve 115 of the discharge circuit closes and the fluid is conveyed from the back-up compartment 372 towards an injection member.

Regardless of the embodiment, and during a default operating phase, the distribution device 76 is in a closed mode, and the injection member or members 70, 72 are then not in fluid connection with the fluid circuit 35. The pumps 32, 33 are active and the fluid 36 circulates in the fluid circuit 35.

If necessary, a phase of assisting a heat engine 10, 20 may be implemented. For example, the assistance phase is initiated by the controller 80 in the event of a failure of one heat engine 10, 20, or indeed in the presence of a failure of one heat engine and/or a necessary power greater than a stored power, on the order of an individual via the human-machine interface, etc.

During this assistance phase, the controller 80 transmits a signal to the distribution device 76 to supply fluid to an injection member 70, 72. On a multi-engine vehicle, in the event of a failure of one heat engine 10, 20, the distribution device 76 is controlled by the controller 80 to supply the injection member 70, 72 of another heat engine 10, 20 that is still operating. According to FIGS. 1 and 3, during the assistance phase, the controller 80 opens a controlled valve 77, 78. According to FIG. 2, the controller 80 controls the hydraulic assistance selector valve 400.

Optionally, the controller 80 chooses the back-up channel 44, 45 that is to be used and/or controls the heater 50 and/or the cooler 60 so that the fluid 36 transmitted to a heat engine 10, 20 has a temperature that lies within a stored temperature range.

Optionally, the controller 80 controls the pump or pumps 32, 33 so that the fluid 36 has a particular flow rate.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present disclosure.

For example, the air-conditioning systems shown in FIGS. 1 and 2 comprise a heater and a cooler. However, the air-conditioning system could have only the heater or the cooler.

What is claimed is:

1. A vehicle provided with a power plant, the power plant having at least one heat engine, the vehicle having an air-conditioning system for controlling the air temperature in a section of the vehicle, the air-conditioning system comprising a fluid circulating in a fluid circulation system, the fluid circulation system comprising a fluid circuit running through the vehicle, the fluid circulation system comprising at least one pump configured to cause the fluid to circulate in the fluid circuit,
- wherein the vehicle comprises an injection member per heat engine of the at least one heat engine, the injection member being configured to inject the fluid into the associated heat engine, the vehicle comprising a back-up circuit fluidly connecting the fluid circulation system to the injection member, the back-up circuit comprising a distribution device controlled by a controller to authorize, on command, circulation of the fluid towards the injection member.

2. The vehicle according to claim 1,
- wherein the vehicle comprises at least one engine computer configured to control the at least one heat engine, the controller comprising the at least one engine computer.

3. The vehicle according to claim 1,
- wherein the controller comprises a human-machine interface.

4. The vehicle according to claim 1,
- wherein the back-up circuit is fluidly connected to the fluid circuit.

5. The vehicle according to claim 1,
- wherein the distribution device comprises a controlled valve per injection member, each controlled valve having a blocker that can be moved from an open position authorizing the circulation of the fluid towards the associated injection member to a closed position preventing the circulation of the fluid towards this associated injection member.

6. The vehicle according to claim 1,
- wherein the fluid circulation system includes an isolation pressure relief valve downstream of an inlet of the back-up circuit, the isolation pressure relief valve being dimensioned to close when the fluid supplies one of the injection members.

7. The vehicle according to claim 1,
- wherein the distribution device comprises a hydraulic assistance selector valve of the fluid circuit, the hydraulic assistance selector valve having at least one back-up channel per injection member, each back-up channel being in fluid communication with an injection member.

8. The vehicle according to claim 1,
- wherein, the fluid circulation system having a heater configured to heat the fluid within the fluid circulation system, the fluid circulation system having a cooler configured to cool the fluid within the fluid circulation system, the controller is connected by a temperature control link to the heater and to the cooler as well as to a temperature sensor measuring a temperature of the fluid, the controller being configured to control a temperature of the fluid by controlling the heater and the cooler.

9. The vehicle according to claim 1,
- wherein the controller is connected by a flow rate control link to the at least one pump, the controller being configured to control the at least one pump at least in the event of fluid being supplied to an injection member.

10. The vehicle according to claim 1,
- wherein the vehicle comprises a power sensor unit measuring a current power produced by the power plant, the controller being connected to the power sensor unit, the vehicle comprising at least two heat engines, the controller being configured to control the distribution device in order to supply one of the heat engines with fluid if the current power prior to a failure of the other heat engine is greater than a stored power.

11. The vehicle according to claim 1,
- wherein the back-up circuit comprises a filtration system upstream of the injection member.

12. The vehicle according to claim 1,
- wherein the back-up circuit comprises a bleed valve per injection member.

13. The vehicle according to claim 1,
- wherein the back-up circuit comprises at least one back-up pressure sensor for measuring the back-up pressure of the fluid in the back-up circuit, the controller communicating with the back-up pressure sensor, the controller being configured to at least emit an alarm or not implement an assistance phase if the back-up pressure is less than an operating pressure threshold.

14. The vehicle according to claim 1,
- wherein the fluid circulation system comprises a tank with two compartments each fluidly connected to the at least one pump by a hydraulic distributor that is controlled by the controller, the two compartments comprising a main compartment and a back-up compartment supplied with fluid by the main compartment, the fluid circulation system comprising a main pressure sensor measuring the main pressure of the fluid, the controller communicating with the main pressure sensor, the controller being configured to control the hydraulic distributor to draw the fluid only from the main compartment when the main pressure is greater than a leakage pressure threshold and from the back-up compartment when the main pressure is less than or equal to the leakage pressure threshold.

15. The vehicle according to claim 14,
- wherein the fluid circulation system comprises a discharge circuit opening into the tank, the discharge circuit being provided with a discharge pressure relief valve configured to open when the hydraulic distributor draws the fluid from the back-up compartment and no injection member is supplied with fluid.

16. The vehicle according to claim 14,
- wherein the fluid circulation system comprises an intermediate pipe connecting the at least one pump to the hydraulic distributor, the hydraulic distributor bringing the at least one pump and the fluid circuit into fluid communication only when the main pressure is greater than the leakage pressure threshold.

17. A method for assisting a power plant of a vehicle, the power plant having at least one heat engine, the vehicle having an air-conditioning system for controlling the air temperature in a section of the vehicle, the air-conditioning system comprising a fluid circulating in a fluid circulation system, the fluid circulation system comprising a fluid circuit running through the vehicle, the fluid circulation system comprising at least one pump configured to cause the fluid to circulate in the fluid circuit,
- wherein the method comprises an assistance phase of assisting a heat engine to be assisted from the at least one heat engine, the assistance phase comprising the following step: activation, on command from a controller, of a distribution device present in a back-up circuit fluidly connecting the fluid circulation system and an injection member, in order to convey the fluid to the injection member supplying fluid to the heat engine to be assisted.

18. The method according to claim 17, wherein, the vehicle comprising at least two heat engines, the method includes a step of detecting a failure of one heat engine from the two heat engines, the assistance phase being implemented for the heat engine that remains in operation following the detection of a failure of one heat engine.

* * * * *